United States Patent [19]
Sato et al.

[11] Patent Number: 5,736,824
[45] Date of Patent: Apr. 7, 1998

[54] MOTOR CONTROL APPARATUS

[75] Inventors: Tetsuya Sato; Yoshio Kawamura, both of Kariya, Japan

[73] Assignee: Denso Corporation, Kariya, Japan

[21] Appl. No.: 741,108

[22] Filed: Oct. 30, 1996

[30] Foreign Application Priority Data

Oct. 30, 1995 [JP] Japan ................................. 7-282261
Sep. 25, 1996 [JP] Japan ................................. 8-253555

[51] Int. Cl.$^6$ ............................ G05B 13/04; G05B 13/00
[52] U.S. Cl. ...................... 318/561; 318/560; 318/610; 364/157
[58] Field of Search ............................ 318/560–696; 364/474.01–474.32, 149–170

[56] References Cited

U.S. PATENT DOCUMENTS

| | | | |
|---|---|---|---|
| 4,647,826 | 3/1987 | Ota | 318/561 |
| 5,304,905 | 4/1994 | Iwasaki | 318/561 |
| 5,418,440 | 5/1995 | Sakaguchi et al. | 318/560 |
| 5,495,158 | 2/1996 | Schmidt et al. | 318/561 |

FOREIGN PATENT DOCUMENTS

| | | |
|---|---|---|
| 61-244286 | 10/1986 | Japan. |
| 4-141708 | 5/1992 | Japan. |
| 5-119804 | 5/1993 | Japan. |
| 7-024470 | 3/1995 | Japan. |
| 7-281708 | 10/1995 | Japan. |

*Primary Examiner*—Paul Ip
*Attorney, Agent, or Firm*—Cushman Darby & Cushman IP Group of Pillsbury Madison & Sutro LLP

[57] ABSTRACT

A motor control apparatus comprises a speed command signal generating section generating a speed command signal for accelerating or decelerating a control object in accordance with a predetermined pattern. A position control section controls the position of the control object and a speed control section controls the speed of the control object by accelerating or decelerating the control object in accordance with the speed pattern. An encoder observes the present position of the control object. The load inertia of the control object is identified based on a positional deviation between the command position of the control object and the present position obtainable from the encoder at the time the speed command generated from the speed command signal generating means becomes a predetermined speed.

5 Claims, 11 Drawing Sheets

| OPERATION JUDGEMENT FACTOR | CAUSE ANALYSIS AND ERROR DISPLAY EXAMPLE |
|---|---|
| OVERSHOOT | LACK OF RIGIDITY AT LOAD SECTION |
| IN POSITION | EXCESSIVE SLIDING RESISTANCE AT MOVABLE SECTION |
| MOTOR INSTABILITY | LACK OF RIGIDITY AT TRANSMISSION MECHANISM, OR EXCESSIVE BACKLASH AT GEAR |

MOTOR CONTROL APPARATUS

BACKGROUND OF THE INVENTION

1. Field of the Invention

This invention relates to the control of servo motors, such as robots, and more particularly to a position-determining motor control apparatus having a function of automatically adjusting control parameters as well as a function of identifying the load inertia of a control object prior to an automatic adjustment of the control parameters.

2. Related Art

In the field of position and speed control, conventional servo motors, such as robots, are usually controlled by a PID control. The PID control is characterized in that each of P(proportional), I (integral) and D(differential) control parameters is adequately adjusted in accordance with the control object. To determine these control parameters to be adequate values, mandatorily necessary thing is to adjust them based on the expertise and know-how obtained from the practical operations performed by proficient and skillful operators. Such an adjustment is generally complicated and time-consuming; therefore, there is a strong need for realizing an automation of this kind of control parameter adjustment.

To realize it, a control apparatus incorporating a micro processor has been already developed and has a function of automatically adjusting these control parameters under the control of this micro processor. FIG. 9 shows a control system having a conventional PID control apparatus having a function automatically adjusting control parameters by using a micro processor. This control system comprises an external input device 50 allowing an operator to enter various setting signals therethrough, a PID control device 60 not only controlling the motor but automatically adjusting control parameters, a control object 70 involving the motor to be controlled based on the control signal supplied from PID Control apparatus 60, and a monitor device 80 (e.g. speed sensor) monitoring the operation of control object 70.

FIG. 10 shows the details of the PID control device 60. As shown in FIG. 10, PID control device 60 comprises an identification signal generating section 61, an ordinary process signal generating section 62, a switching section 66, a control section 64, an identification section 65, and an adder 66. More specifically, identification signal generating section 61 generates an identification signal (equivalent to a step signal) in response to a command supplied from identification section. 65, for identifying a load inertia of the control object prior to the automatic adjustment of control parameters. This identification signal is sent to control section 64 through switching section 63, and is also sent to identification section 65 directly.

Ordinary process signal generating section 62 generates an ordinary process signal (e.g. a speed command signal) in response to a command supplied from identification section 65, for controlling the position of the control object. This ordinary process signal is sent to control section 64 through switching section 63. Switching section 63, in response to the command signal supplied from identification section 65, selectively switches its selecting terminal between the identification signal sent from identification signal generating section 61 and the ordinary process signal sent from ordinary process signal generating section 62.

Identification section 65 is constituted by a micro computer comprising CPU, ROM, RAM and others. This identification section 65, in the identification of the load inertia, sends out the command signal to identification signal generating section 61 to generate the above-described identification signal. At the same time, identification section. 65 sends out the switching command to the switching section 63 so that the switching section 63 connects its selecting terminal to the identification signal generating section 61, thereby entering the identification signal to control section 64.

Thereafter, identification section 65 compares the identification signal generated from identification signal generating section 61 and the observation result (actual speed) obtained from monitor device 80, and then performs the identification of the load inertia of control object 70 based on the comparison result. The identification result thus obtained are sent to the speed control section of the control section 64 as initial values of the control parameters to be used in the adjustment of these control parameters.

On the other hand, identification section 65, in the control parameter adjustment (tuning operation), sends out the command signal to ordinary process signal generating section 62 to produce the ordinary process signal (i.e. speed command signal). At the same time, identification section 65 sends out the switching command to the switching section 63 so that the switching section 63 connects its selecting terminal to the ordinary process signal generating section 62, thereby entering the ordinary process signal to control section 64. Thereafter, identification section 65 compares the ordinary process signal generated from the ordinary process signal generating section 62 and the observation result (actual speed) obtained from monitor device 80, and then adjusts the initial values of the control parameters of control object 70. The control parameters thus adjusted are sent to the speed control section of the control section 64.

Control section 64 controls the actuation of control object 70 involving the motor. Adder 66 adds the ordinary process signal or the identification signal sent out from switching section 63 and the monitoring signal sent out from monitor device 80. Control section 64, in the identification of the load inertia, gives a control output to the motor of control object 70 as a control amount based on the predetermined control parameters. This control output is obtained as a speed deviation between the identification signal produced from identification signal generating section 61 and the observation result (actual speed) obtained from monitor device 80. The motor of control object 70 is driven and controlled in accordance with this control amount. In other words, the control object 70 causes an operational movement by a predetermined distance based on this control amount.

On the other hand, control section 64, in the control parameter adjustment (tuning), gives another control output to the motor of control object 70 as a control amount based on the initial values of control parameters in this control parameter adjustment operation. This control output is obtained as a speed deviation between the ordinary process signal produced from ordinary process signal generating section 62 and the observation result (actual speed) obtained from monitor device 80. The motor of control object 70 is driven and controlled in accordance with this control amount. In other words, the control object 70 causes an operational movement by a predetermined distance based on this control amount.

An automatic adjustment of control parameters in the PID control apparatus 60 is generally performed in the following manner. As shown in the flow chart of FIG. 11, when an operator (not shown) selects the automatic adjustment mode through the external input device 50, the identification section 65 of PID control apparatus 60 confirms the automatic adjustment mode the control parameters being entered and then starts the processing of the automatic adjustment mode at step 300. Then, at step 320, identification section 65 sends out the command signal to identification signal generating section 61 to generate the identification signal. At the same time, identification section 65 sends out the switching command to the switching section 63 so that switching section 63 connects its selecting terminal to the identification signal generating section 61, thereby inputting the identification signal to the control section 64.

With this operation, adder 66 receives both the identification signal and the observation result (actual speed) obtained through monitor device 80. Adder 66 obtains a speed deviation based on these data and sends it to control section 64. In response to this speed deviation, the control section 64 gives this speed deviation to the motor of control object 70 as a control amount based on the predetermined control parameters. According to this control amount, the motor of control object 70 is driven and controlled so as to cause an operational movement by the predetermined distance based on the control amount. Then, as described later, identification 65 identifies the load inertia of control object 70 based on both the monitor signal (the speed signal in this case) obtained from monitor device (speed sensor) 80 and the identification signal obtained from identification signal generating section 61. Then, the identified result is sent to control section 64 as initial values for the control parameters in the control parameter adjustment operation.

The control section 64, when it receives the initial values of the control parameters in the control parameter adjustment, performs the adjustment of the control parameters applied to control object 70, at step 340. More specifically, identification section 65 sends out the command signal to the ordinary process signal generating section 62 to generate the ordinary process signal (i.e. speed command signal). At the same time, identification section 65 sends out the switching command to switching section 63 so that the switching section 63 switches its selecting terminal to the ordinary process signal generating section 62, thereby inputting the ordinary process signal to the control section 64.

With this operation, adder 66 receives both the ordinary process signal (i.e. speed command signal) and the observation result (actual speed) obtained through monitor device 80. Adder 66 obtains a speed deviation based on these data and sends it to control section 64. In response to this speed deviation, the control section 64 gives this speed deviation to the motor of control object 70 as a control amount based on the above-described initial values of the control parameters. According to this control amount, the motor of control object 70 is driven and controlled so as to cause an operational movement by the predetermined distance based on the control amount. Then, identification 65 adjusts the initial values of the control parameters (i.e. performs the resetting of the control parameters) of control object 70 based on a positional deviation between the command position obtained from the ordinary process signal generated from ordinary process signal generating section 62 and the present position obtained from the observation result (actual speed) of monitor device 80. The control parameters thus adjusted are sent to the control section 64 to cause an operational movement of control object 70 in accordance with these control amounts.

Next, at step 360, a judgement is made to check if the control object 70 operates ordinarily. Namely, it is checked whether the control object 70 having been operated in the step 340 is within a predetermined referential region. If the control object 70 is not within the predetermined referential region, i.e. "NO" at step 360, the control parameters are adjusted again in step 340. By repetitively performing the processing of the steps 340 and 360, the control object 70 comes within the predetermined referential range (i.e. "YES" at step 360). Thus, the control parameters are finalized, and the automatic adjustment processing of the control parameters is terminated at step 380.

FIG. 12 is a flow chart showing the details of the identification of the load inertial of the control object in the above-described PID control apparatus 60. In FIG. 12, when the operator selects the automatic adjustment mode through the not-shown external input device 50 (refer to FIGS. 9 and 10), identification section 65 of PID control apparatus 60, which is a micro computer, confirms the automatic adjustment mode for the control parameters. Then, at step 321, the processing of identifying the load inertia.

Then, at step 322, identification section 65 of PID control apparatus 60 sends out the command signal to identification signal generating section 61 to generate the identification signal (i.e. command speed) having a speed pattern shown by the pulse curve "B" of FIG. 13. At the same time, identification section 65 sends out the switching command to switching section 63 so that switching section 63 connects its selecting terminal to the identification signal generating section 61, thereby inputting the step-like identification signal to adder 66.

With this operation, the command speed increases up to the Vmax, and the adder 66 receives both the identification signal and the observation result (actual speed) obtained from the monitor device 80. Adder 66 obtains a speed deviation by adding these two input data. Then, the speed deviation thus obtained is sent to the control section 64. This speed deviation is given from control section 64 to the motor of control object 70 as a control amount based on the predetermined control parameter. In accordance with this control amount, the motor of control object 70 is accelerated so that its actual speed is increased up to Vmax.

In FIG. 13, curve "b" shows the actual speed of the motor of control object 70, obtained when it is driven in accordance with the identification signal. Curve "D" shows the command position of the control object 70 calculated in accordance with the identification signal. And, curve "d" shows the present position of the control object, obtained when it is driven in accordance with the identification signal.

After identification signal generating section 61 generated the identification signal (i.e. command speed), it is judged whether the command speed has reached Vmax at step 323. When the judgement result is "YES" at step 323, the control flow proceeds to the next step 324. On the other hand, when the command speed has not yet reached Vmax (i.e. "NO" in step 323), the judgement processing of step 323 is continuously repeated until the judgement result turns to "YES".

After the command signal has reached Vmax, another judgement is made based on the observation signal (i.e. speed signal) obtained from monitor device (i.e. speed sensor) 80 at the step 324 as to whether the actual speed (refer to curve "b" of FIG. 13) of the motor of control object 70 has reached Vmax. The judgement processing of step 324 is continuously repeated unless the judgement result turns to "YES".

When the actual speed of the motor of control object 70 has reached Vmax, the control flow proceeds to the next step 325. In step 325, the time duration is calculated with respect to the acceleration time ($t_p$ of FIG. 13) required from the start-up acceleration of the motor of control object 70 until the actual speed reaches to Vmax.

Next, at step 326, the command speed is reduced from Vmax to 0 as shown by "B" in FIG. 13. Then, at step 327, it is judged whether the actual speed of the motor of control object 70 has reduced to 0. If the judgement result is "NO" at step 327, the steps 326 and 327 are continuously repeated unless the judgement result turns to "YES". If the judgement result is "YES" at step 323, the control flow proceeds to step 328. At step 328, identification section 65 identify the load inertia based on the acceleration time $t_p$ required for the actual speed of the motor of control object 70 reaching to Vmax, which is calculated at step 325. Then, the operation of identifying the load inertia is accomplished at step 329.

According to the above-described load-inertia identification method, detection of the actual speed of the motor reaching to Vmax is definitely necessary. However, the actual speed of the motor fluctuates so widely that no detection is substantially possible with respect to the accurate time the actual speed of the motor has reached to Vmax. In other words, identification of the load inertia was not accurate according to the above-described conventional method. For this reason, there is the possibility that the initial values of control parameters cannot be accurately set. If the control parameters are adjusted based on these incorrect initial values, the overall control will not be stabilized.

Furthermore, according to the above-described conventional load-inertia identification method, there is the necessity of observing the actual speed of the motor of control object 70 reaching to Vmax. Hence, it takes a long time to accomplish the identification processing when the control object 70 has a large load inertia. This will surely worsen the efficiency in the load-inertia identification processing.

Yet further, with increasing driving time of the motor, the control object 70 moves a significantly long distance. This forces the operator to remove any obstacles existing within a movable space of control object 70, thus further deteriorating the working efficiency in the load-inertia identification processing.

SUMMARY OF THE INVENTION

Accordingly, in view of above-described problems encountered in the related art, a principal object of the present invention is to provide a motor control apparatus capable of accurately identifying the load inertia of the control object and shortening the time required for this load-inertia identification processing.

In order to accomplish this and other related objects, the present invention provides a motor control apparatus having various aspects which will be explained hereinafter together with reference numerals in parentheses which show the correspondence to the components of the preferred embodiments of the present invention described later.

According to the first aspect of the present invention, a motor control apparatus is associated with a motor (31) moving a control object (30) having load inertia in accordance with its rotation, and automatically adjusts preset control parameters based on the positional deviation between the command position of the control object and the present position of the control object. Monitor means (40) observes the present position of the control object (30). Speed command signal generating means (21) generates a speed command signal for accelerating or decelerating the control object (30) in accordance with a predetermined pattern (curve "A"). Speed control means (26) gives the speed command signal generated from the speed command signal generating means (21) to the motor (31) as a control amount in accordance with the preset control parameters. Identification means (28) identifies the load inertia of the control object (30) based on a positional deviation signal between a command position signal of the control object (30) obtainable from the speed command signal and a present position signal obtainable from the monitor means (40) at the time (tq) the speed command signal generated from the speed command signal generating means (21) becomes a predetermined speed (Vn), so that the load-inertia identification of the control object (30) can be performed prior to the automatic adjustment of the preset control parameters.

Furthermore, according to the second aspect of the present invention, a motor control apparatus is associated with a motor (31) moving a control object (30) having load inertia in accordance with its rotation and automatically adjusts preset control parameters based on the positional deviation between the command position of the control object and the present position of the control object. Monitor means (40) observes the present position of the control object. Speed command signal generating means (21) generates a speed command signal for accelerating or decelerating the control object in accordance with a predetermined pattern (curve "A"). Position control means (25) obtains a positional deviation signal based on the command position which is obtained by integrating the speed command signal generated from the speed command signal generating means (21) and the present position of the control object (30) supplied from the monitor means (40). The positional deviation signal, in this case, is a speed signal in accordance with a first control parameter of the control parameters. Furthermore, position control means (25) outputs a first speed signal having the level of a predetermined first ratio of the speed signal.

Feedforward control means (22) outputs a second speed signal having the level of a predetermined second ratio of the speed command signal generated from the speed command signal generating means (21). Speed control means (26) obtains a speed deviation signal based on the first speed signal produced from the position control means (25), the second speed signal produced from the feedforward control means (22), and an actual speed signal obtained by differentiating the present position supplied from the monitor means (40), and gives the speed deviation signal to the motor (31) as a control amount in accordance with a second control parameter of the control parameters. Switching means (23) gives the predetermined first ratio to the position control means (25) and gives the predetermined second ratio to the feedforward control means (22). And, identification means (28) identifies the load inertia of the control object (30).

In this second aspect invention, when the load inertia is identified, the switching means (23) sets the predetermined second ratio to be larger than the predetermined first ratio, and the identification means (28) identifies the load inertia of the control object (30) based on a positional deviation signal between a command position signal of the control object (30) obtainable from the speed command signal and a present position signal obtainable from the monitor means (40) at the time (tq) the speed command signal generated from the speed command signal generating means (21) becomes a predetermined speed (Vn). When the first and second control parameters are adjusted, the switching means (23) sets the predetermined second ratio to be smaller than the predetermined first ratio, and the identification means (28) sets the first and second control parameters in accordance with the identified load inertia as initial values of the control parameters in the adjustment of the control parameters.

According to preferred embodiment of the present invention, when the load inertia is identified, the predetermined first ratio is set to 0% while the predetermined second ratio is set to 100%. On the other hand, when the first and second control parameters are adjusted, the predetermined first ratio is set to 70% and the predetermined second ratio is set to 30%.

Furthermore, it is preferable that, assuming that I represents the load inertia and Pe represents the positional deviation, the load inertia I is obtained according to the following equation $$I = Ka \cdot Pe + Kb$$

where Ka and Kb represent coefficients at the time (tq) the speed command signal becomes the predetermined speed (Vn).

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
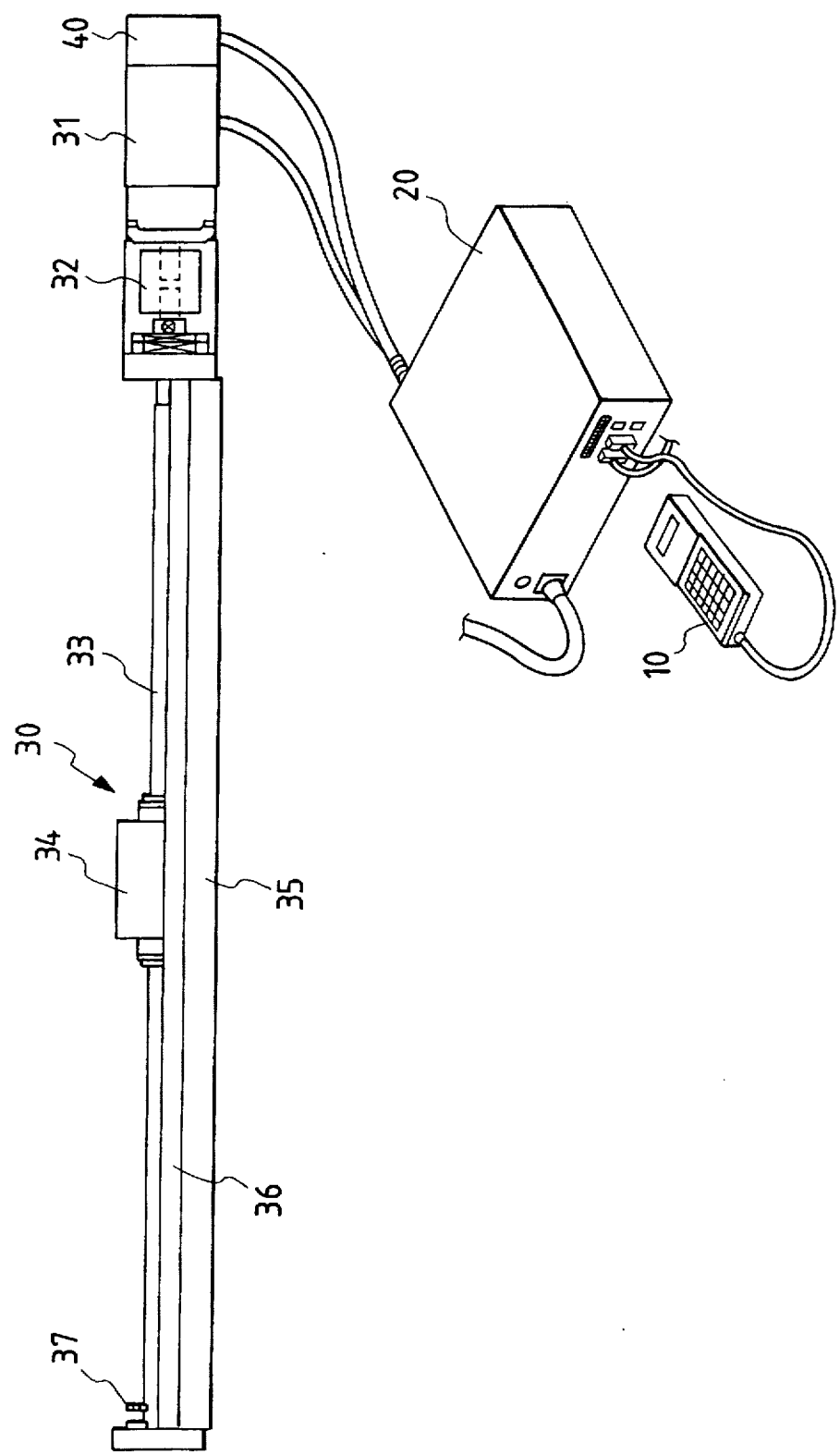
FIG. 1 is a schematic view showing the overall arrangement of a transportation robot incorporating a PIP control apparatus in accordance with a first embodiment of the present invention.

A preferred embodiment of the present invention will be explained in greater detail hereinafter with reference to the accompanying drawings. Identical parts are denoted by the same reference numerals throughout the views.

FIG. 1 is a schematic view showing the overall arrangement of a transportation robot incorporating a PID control apparatus in accordance with a first embodiment of the present invention. The robot shown in FIG. 1 discloses a single-axis movable shaft; however, it is needless to say that the present invention can be applied to a two-axis movable shaft or a three-axis movable shaft.

In FIG. 1, a robot 30, serving as a control object, comprises a motor 31 whose driving operation is controlled in accordance with a control signal sent from a PID control apparatus 20 later-described, and a coupling 32 connected to the output shaft of motor 31 and serving as a transmission mechanism transmitting a rotational force of motor 31 to a ball screw shaft 33. Hence, ball screw shaft 33, connected to coupling 32, causes a rotation in response to the rotation of motor 31. Robot 30 further comprises a slider 34 which accommodates a ball therein. The ball of slider 34 is engageable with the screw portion of ball screw shaft 33, so that the slider 34 can cause a shift motion along the axial direction of ball screw shaft 33 when the ball screw shaft 33 is rotated. The slider 34 is slidably supported on a base 35. A guide 38 is disposed on the base 35 to prevent slider 34 from causing a rotational motion about its shaft. A stopper 37 is provided at the remote end of base 35 to stop the slider 34. Although not shown, slider 34 has an arm used for holding a transport item and transporting it from one spot to another spot.

An encoder 40 is disposed at the opposite side of motor 31 to detect the rotation of motor 31. The present position of slider 34 can be known from the signal obtained from this encoder 40. Robot S0 is connected to PID control apparatus 20. PID control apparatus 20 has a function of automatically adjusting the control parameters. Based on the command entered from an external input device 10 (through operator's key manipulation) and the present position signal obtained from encoder 40, PID control apparatus 20 controls motor 31 of motor 30. Then, slider 34 causes a shift motion in response to the rotation of motor 31. Hence, the arm of slider 34 can move the transportation item from one spot to another spot.

Figure 2:
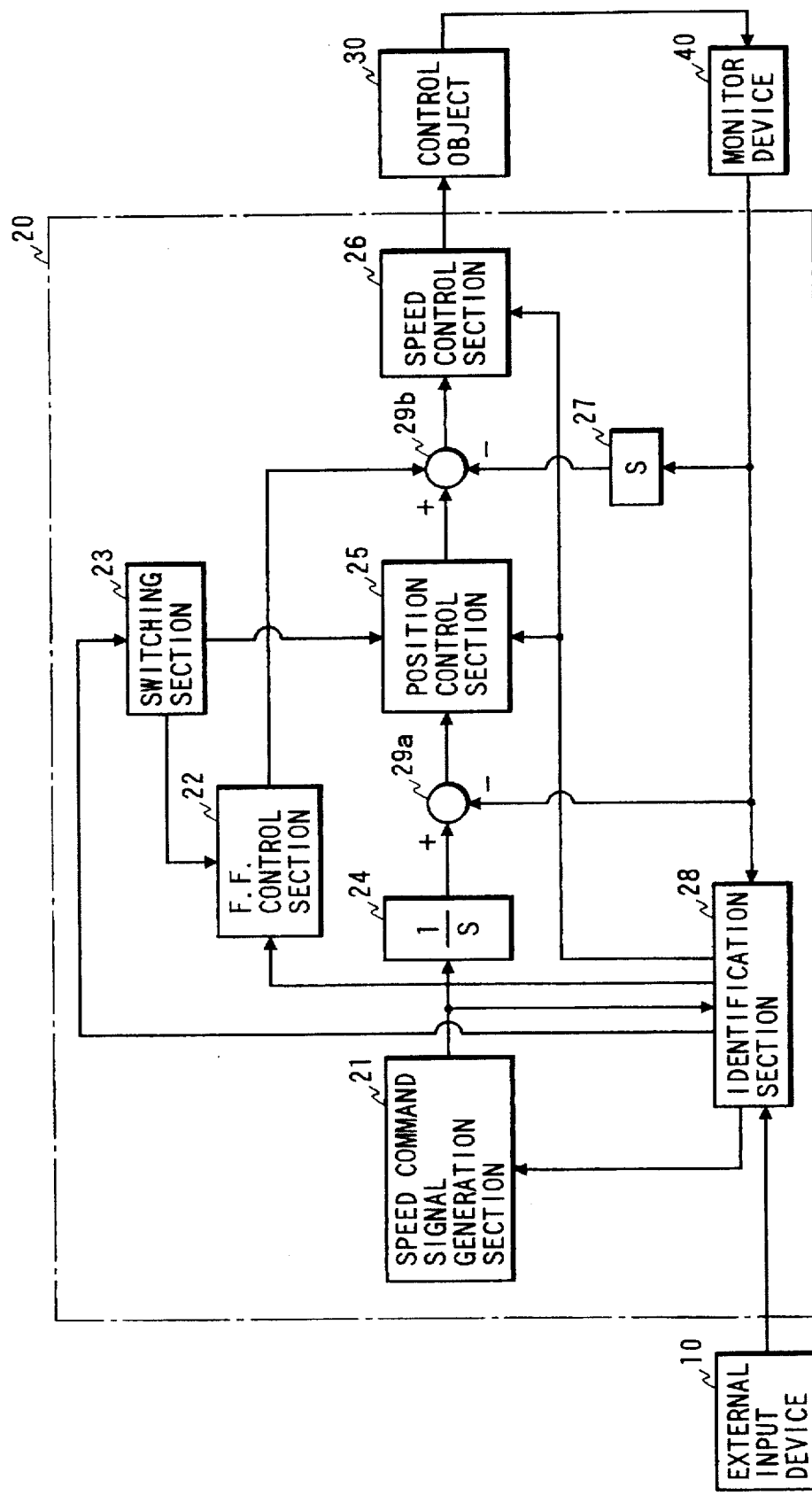
FIG. 2 is a block diagram showing the arrangement of the PIP control apparatus shown in FIG. 1.

FIG. 2 is a block diagram showing the arrangement of the PID control apparatus 20 shown in FIG. 1. PID control apparatus 20 comprises a speed command signal generating section 21 generating a speed command signal used for identifying the load inertia of control object (i.e. robot) 30 and also generating another speed command signal used for adjusting the control parameters, an FF control section 22 performing the feedforward control, an integral element 24 integrating the speed command signal, a position control section 25 performing the position control of control object 30, and a switching section 23 which changes the setting values supplied to FF control section 22 and position control section 25 in each operation of the load inertia identification and the control parameter adjustment.

Furthermore, PID control apparatus 20 comprises a speed control section 26 performing the speed control of control object 30, a derivative element 27 differentiating the output of encoder 40 serving as a monitor device, an identification section 28 which performs the identification of the load inertia as well as adjustment of the control parameters, a first adder 29a which adds the speed command signal (i.e. command position signal) integrated through integral element 24 and the output signal (i.e. present position signal) obtained from encoder 40, and a second adder 29b which adds the output signal (actual speed signal) of encoder 40 differentiated through derivative element 27, the output signal of position control section 25, and the output signal of FF control section 22.

Speed command signal generating section 21 generates the speed command signal used for identifying the load inertia as well as the speed command signal used for adjusting the control parameters. The control command signals, thus generated from speed command signal generating section 21, are sent to position control section 25 through integral element 24 and sent directly to identification section 28. FF control section 22 converts the speed command signal generated from speed command signal generating section 21 into a speed signal corresponding to a predetermined second ratio being set by the switching section 23. Then, FF control section 22 produced a second speed signal by performing the feedforward control of the speed signal thus obtained and sends this second speed signal to the second adder 29b. Integral element 24 converts the speed command signal into a command position signal by integrating the speed command signal generated from speed command signal generating section 21. The command position signal thus produced is sent to the first adder 29a.

First adder 29a obtains a positional deviation signal by adding the command position signal converted through integral element 24 and the output signal (i.e. present position signal of slider 34) obtained from encoder 40, and then sends the resultant positional deviation signal to the position control section 25. In the position control section 25, the positional control parameter (first control parameter) is beforehand set for the use in the position control of control object 30. Position control section 25 converts the positional deviation signal entered from first adder 29a into a positional deviation signal corresponding to a predetermined first ratio being set by the switching section 23, and then adjusts the resultant positional deviation signal in accordance with the predetermined positional control parameter (i.e first control parameter). The positional deviation signal, adjusted in accordance with the positional control parameter (i.e. first control parameter), is sent to the second adder 29b as a first speed signal.

Derivative element 27 produces an actual speed signal of slider 34 by differentiating the output signal (i.e. the present position signal of slider 34 in this embodiment) obtained from encoder 40 serving as a monitor device. The actual speed signal thus produced is sent to the second adder 29b. Second adder 29b obtains a speed deviation signal by adding the second speed signal generated from FF control section 22, the first speed signal generated from position control section 25, and the actual speed signal of slider 34 differentiated by derivative element 27. The speed deviation signal thus obtained is sent to speed control section 26.

In speed control section 26, the speed control parameter (second control parameter) is beforehand set for the use in the speed control of motor 31 serving as a speed control object. The speed deviation signal generated from second adder 29b is converted into a control amount corresponding to the predetermined speed control parameter (i.e. second control parameter). The control amount thus obtained is given to the motor 31 of control object 30 to perform the speed control of motor 31.

Switching section 23 determines the ratio between FF control section 22 and position control section 25 in the following manner. When the system is operated under the ordinary PID control, the ratio is determined in such a manner that FF control section 22 is 30% while position control section 25 is 70%. In other words, switching section 23 sets the positional control parameter (i.e. gain) in the ordinary PID control operation at 70% of the inherent value. On the other hand, in the identification of the load inertia of robot motor 30, the switching section 23 changes the ratio in such a manner that FF control section 22 is 100% while position control section 25 is 0%. With these settings, during the load inertia identification of robot 30, the speed command signal generated from speed command signal generating section 21 is directly entered into second adder 29b through FF control section 22.

In the load inertia identification, the identification section 28, which is a micro computer comprising CPU, ROM, RAM etc, sends out the command signal to speed command signal generating section 21 to generate the speed command signal. At the same time, identification section 28 sends out the switching command to switching section 23 so that FF control section 22 operates at the level of 100% and the position control section 25 operates at the level of 0%. Furthermore, based on the speed command signal obtained from speed command signal generating section 21 and the observation result (i.e. the present position of control object 30) obtained from monitor device 40, identification section 28 identifies the load inertia of control object 30. The identification result is sent to both the position control section 25 and speed control section 26 as initial values for the use in the adjustment of the control parameters.

On the other hand, in the adjustment of control parameters (i.e. in the tuning operation), the identification section 28 sends out the command signal to speed command signal generating section 21 to generate the speed command signal. At the same time, identification section 28 sends out the switching command to switching section 23, so that FF control section 22 operates at the level of 30% and the position control section 25 operates at the level of 70%. Furthermore, the identification section 28 adjusts the initial values of the control parameters of control object 70, based on the speed command signal produced from speed command signal generating section 21 and the observation result (the present position of control object 30) obtained from monitor device 40. The control parameters thus adjusted are then sent to position control section 25 and speed control section 26.

Figure 3:
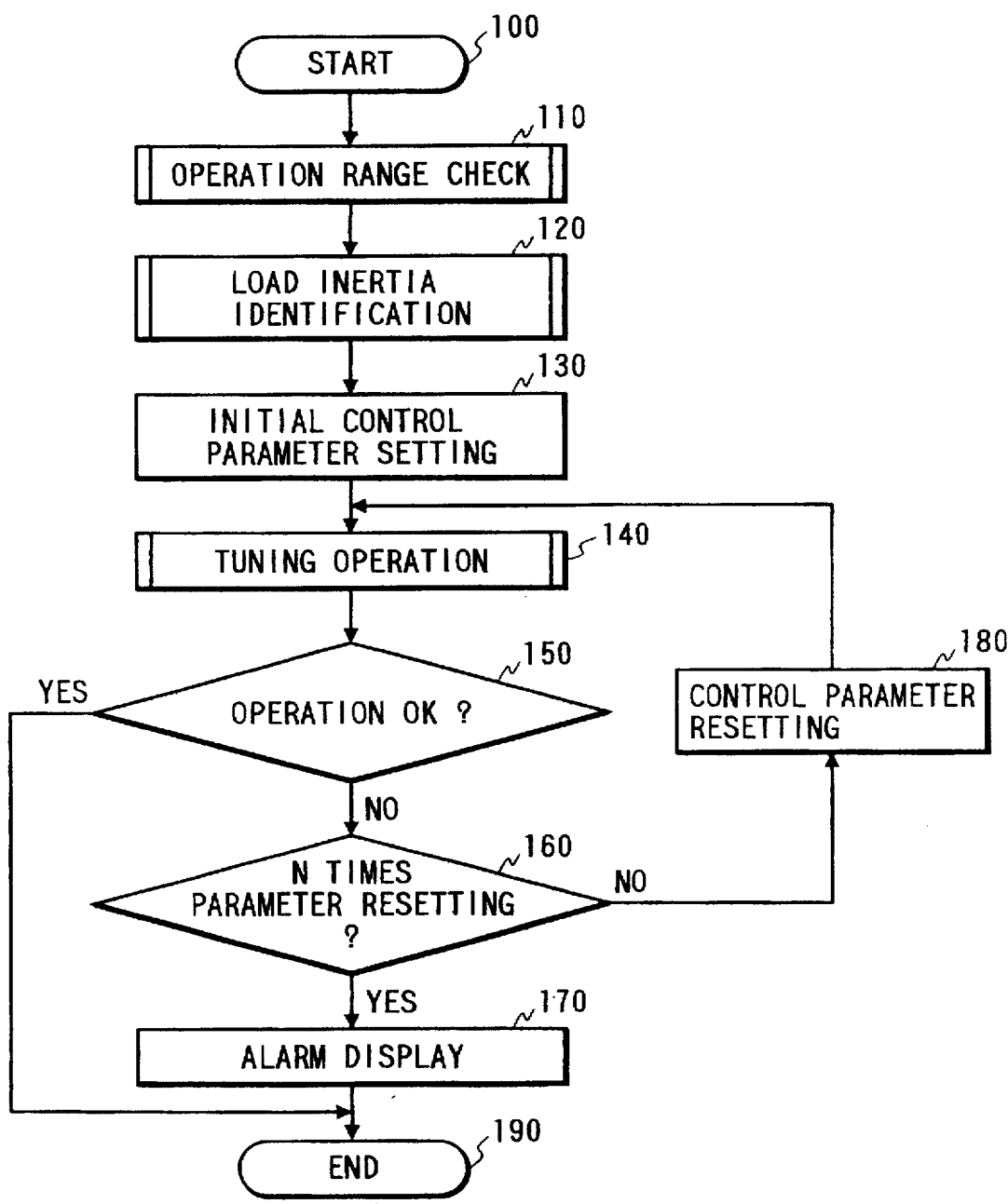
FIG. 3 is a flow chart showing an operation of the PIP control apparatus shown in FIG. 1.
Figure 4:
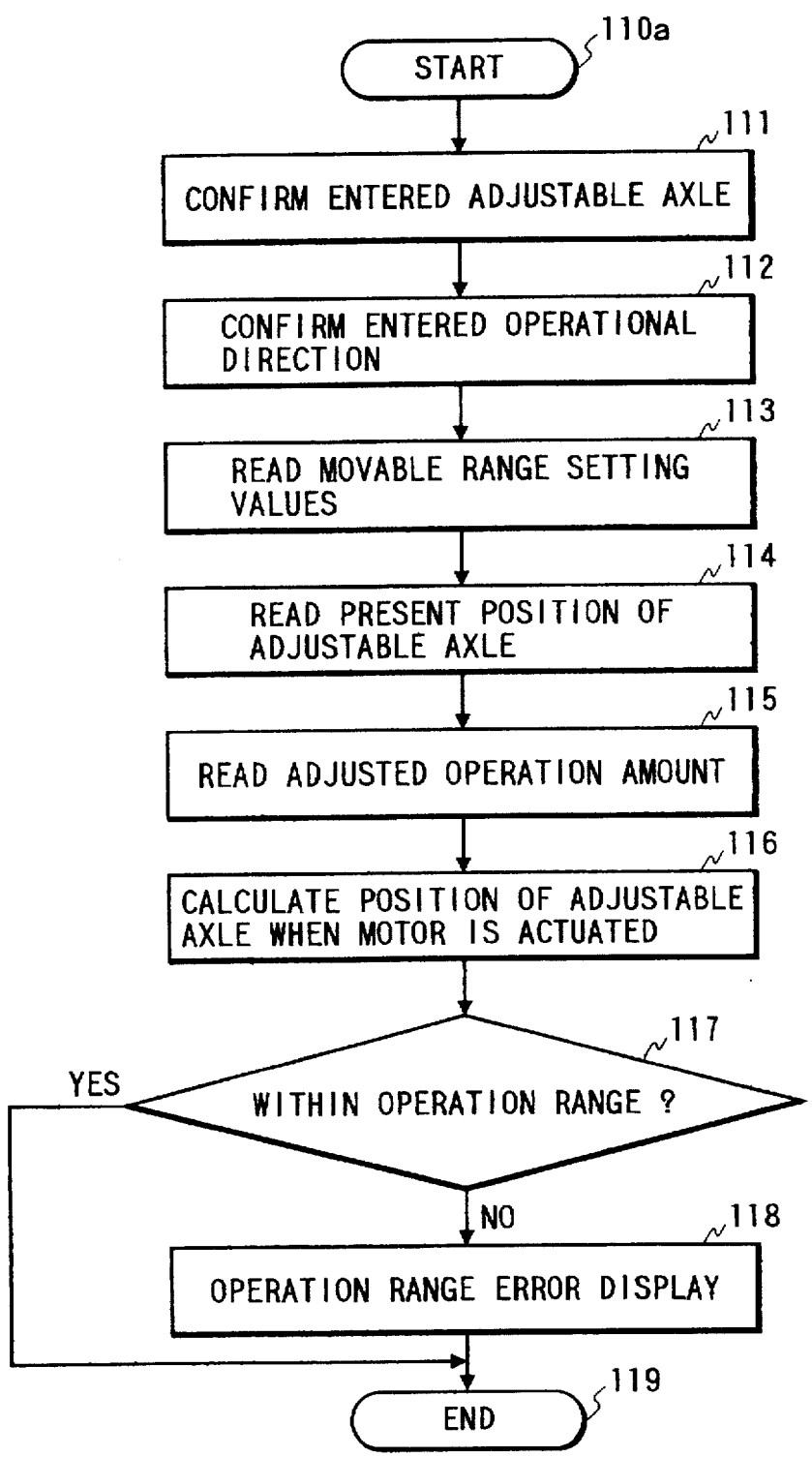
FIG. 4 is a flow chart serving as one of sub routines of the flow chart of FIG. 3, which shows the details of an operation for checking the operation range of the PIP control.
Figure 5:
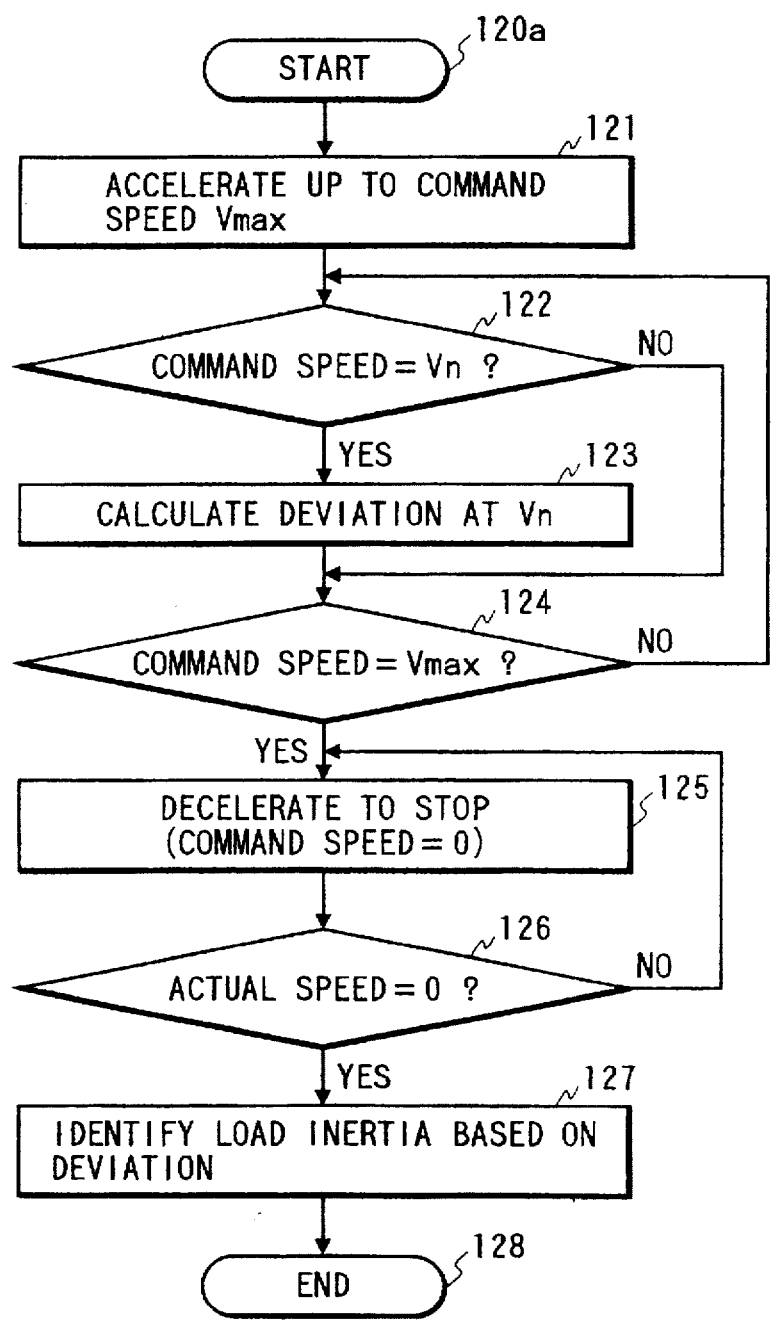
FIG. 5 is a flow chart serving as one of the sub routines of the flow chart of FIG. 3, which shows the details of an operation for identifying a load inertia in the PID control.
Figure 6:
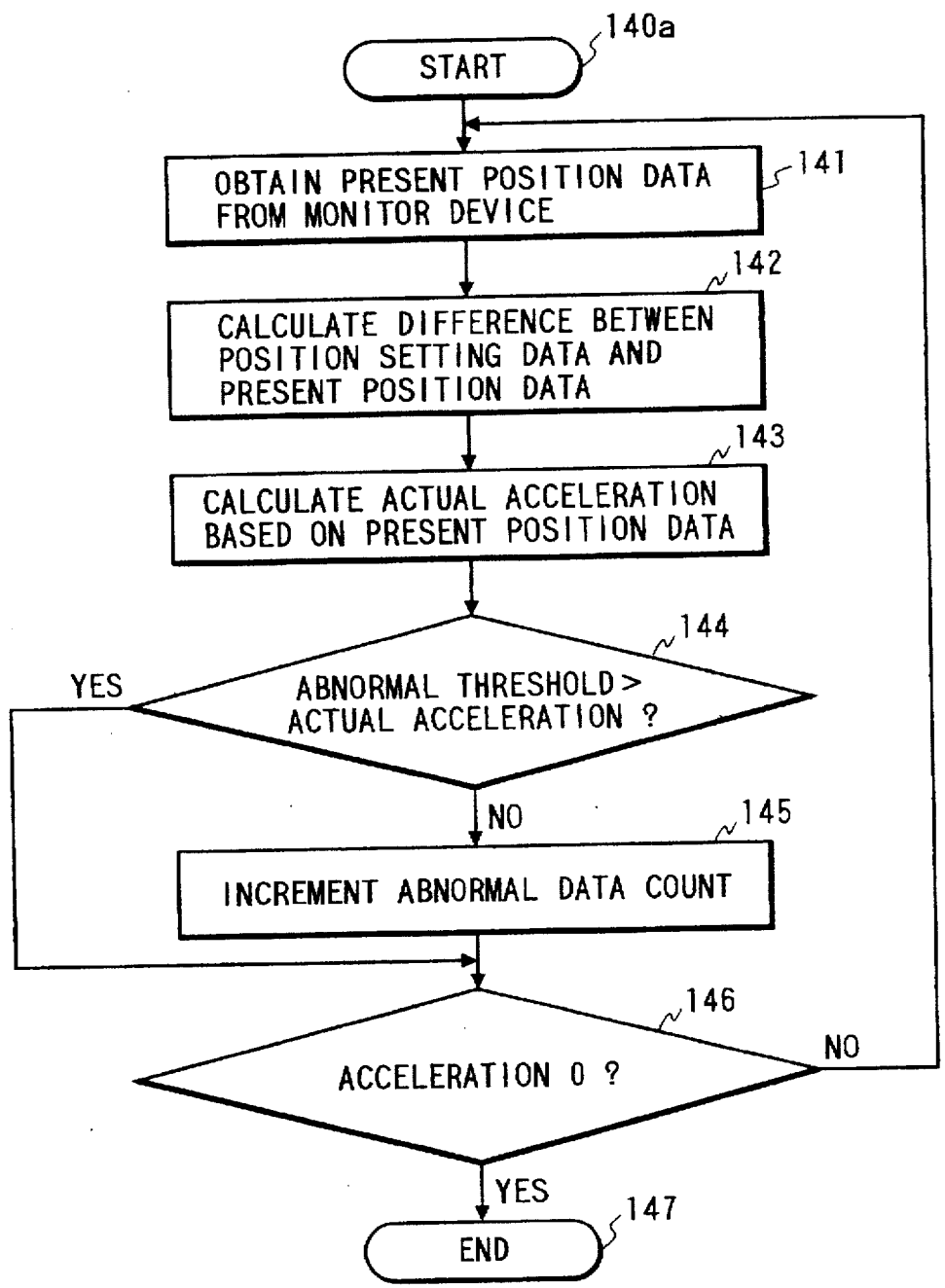
FIG. 6 is a flow chart serving as one of the sub routines of the flow chart of FIG. 3., which shows the details of a tuning operation in the PID control.

Next, the operation of the above-described PID control apparatus 20 will be explained. FIGS. 3 through 6 are flow charts explaining various operations of the PID control apparatus 20 comprising the initial setting through the adjustment (tuning) of the control parameters, such as the position control parameter (i.e. first control parameter) being set beforehand in position control section 25 and the speed control parameter (i.e. second control parameter) being set beforehand in speed control section 28. FIG. 3 is a flow chart showing the main routine of the PID control. FIG. 4 is a flow chart showing a sub routine used in the operation range check of FIG. 3. FIG. 5 is a flow chart showing a sub routine used in the load inertia identification of FIG. 3. FIG. 6 is a flow chart showing a sub routine used in the tuning operation of FIG. 3. The programs of these flow charts are stored in ROM of the micro computer (i.e. identification section 28).

In FIG. 3, when an operator (not shown) of robot 30 selects the automatic adjustment mode through external input device 10, the identification section 28 of PID control apparatus 20, which is constituted by a micro computer, confirms that the selected mode is the automatic adjustment mode. At step 100, the automatic adjustment mode processing is initiated. At step 110, identification section 28 of PID control apparatus 20 performs the operation range check (later described) for checking the operation range of the control object (i.e. slider 34) based on the setting values entered by the operator through external input device 10 (i.e. suggestion indicating the direction of the robot and the distance to be shifted, in this case).

After finishing the operation range check, the control flow proceeds to step 120. In this step 120, slider 34 is moved by actuating motor 31. Then, the load inertia of robot 30 is identified based on the observation result obtained from encoder 40, i.e. based on the positional deviation between the present position of slider 34 and the command position. After finishing the load inertia identification at step 120, the initial setting of the control parameters is performed at step 130 for the tuning of these control parameters based on the identification result of the load inertia.

Next, using the initial values of the control parameters being set at step 130, PID control apparatus 20 again drives the motor 31 to again move the slider 34. Then, at step 140, the tuning operation (which is later described) is performed for adjusting the control parameters. When the slider 34 comes to operate normally as a result of the tuning of the control parameters, the judgement result is "YES" at step 150. Thereafter, at step 190, the automatic adjustment mode processing is terminated. The details of step 150 will be described later in mode detail.

If the slider 34 does not operate normally due to inadequacy of the control parameters adjusted at the above-described step 140, the judgement result turns to "NO" at step 150. Then, the control procedure proceeds to step 180 to make a judgement as to whether the identification section 28 has already N times performed the control parameter resetting. In this embodiment, N is set to any one of 3, 4 or 5. If the total number of control parameter resettings is less than N, the control parameter resetting is performed at step 180.

After finishing the control parameter resetting at step 180, the control flow returns to the step 140 to repeat the tuning operation of the control parameters. If the total number of control parameter resettings becomes N, the PID control apparatus 20 generate an alarm signal at step 170 to cause the external input device 10 to display or generate alarm. Then, at step 190, the automatic adjustment mode processing is terminated.

FIG. 4 is the flow chart (i.e. sub routine) illustrating the details of the operation range check (i.e. step 110 of the main routine shown in FIG. 3). In the flow chart of FIG. 4, first of all, the operator of robot 30, who selected the automatic adjustment mode, further enters the data through the external input device 10. The data, entered in this case, comprise the designation of the axle of robot 30 to be moved (in this embodiment, ball screw shaft (adjustment axle) 31 of FIG. 1), the direction of the movement (right-and-left direction in FIG. 1), and the distance of the movement. In response to such operator's input manipulation, identification section 28 of PID control apparatus 20 starts the processing of the operation range check at step 110a.

Identification section 28, at step 111, confirms the adjustable axle designated by the operator through external input device 10. Then, identification section 28, at step 112, confirms the operational direction designated by the operator through external input device 10. Then, identification section 28, at step 113, reads the data relating to the setting values determining the movable range of slider 34 which are also designated by the operator through external input device 10.

Furthermore, identification section 28, at step 114, reads the data relating to the present position of slider 34 based on the output signal of encoder 40. Then, at step 115, identification section 28 causes the speed command signal generating section 21 to generate the speed command signal having the speed pattern shown by curve "A" in FIG. 7. Then, the adjusted operation amount (i.e. shift amount) is calculated and read based on the speed pattern.

After reading the adjusted operation amount, an estimated position of slider 34, as a reachable range of slider 34 in response to the actuation of motor 31, is calculated at step 116 based on the adjusted operation amount calculated at step 115 and the present position data read in step 114. Next, at step 117, it is checked whether the estimated position of slider 34 calculated at step 116 is within a predetermined operation range (i.e. movable range) of slider 34.

When the estimated position of slider 34 is out of the operation range of slider 34 (i.e. ".NO" at step 117), the control flow proceeds to step 118 to send out a signal to external input device 10 to display the indication that slider 34 is out of the predetermined operation range. Then, at step 119, the operation range check processing is terminated.

As described above, the present invention generates or displays alarm through external input device 10 before starting operation of robot 30, when the estimated position of slider 34 calculated at step 116 is out of the predetermined operation. Hence, it becomes possible to prevent the robot 30 from being damaged.

FIG. 5 is the flow chart (i.e. sub routine) illustrating the details of the load inertia identification (i.e. step 120 of the main routine shown in FIG. 3). After the operation range check of step 110 is finished, the processing of identifying the load inertia is started at step 120a. At step 121, the identification section 28 of PID control apparatus 20 activates the speed command signal generating section 21 to generate the speed command signal having the speed pattern shown by curve "A" in FIG. 7, and increments this speed command signal successively.

Figure 7:
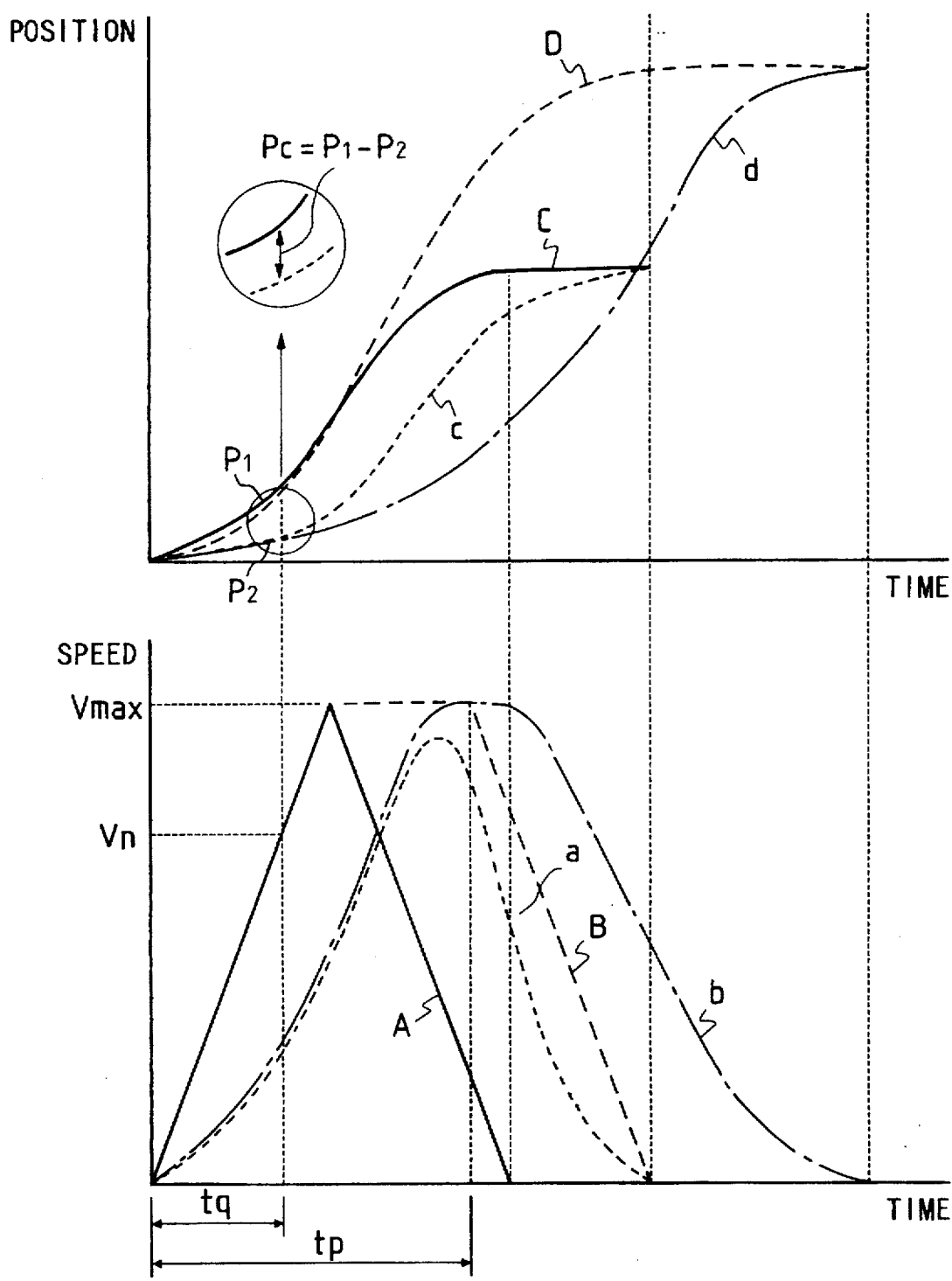
FIG. 7 is a graph showing the relationship between the command position and the present position of the control object in the PID control apparatus shown in FIG. 2, as well as the relationship between the command speed and the actual speed of the control object.
Figure 13:
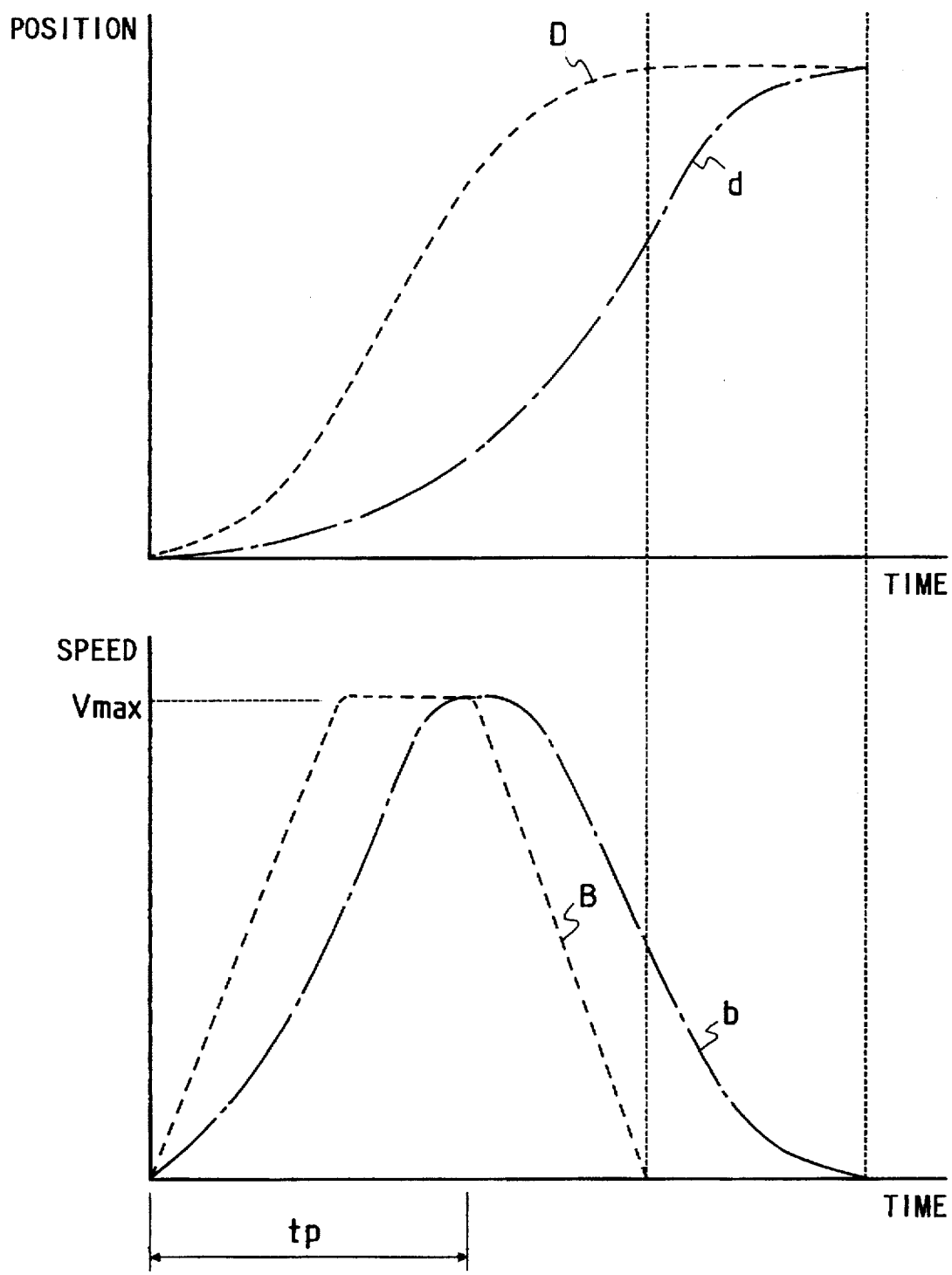
FIG. 13 is a graph showing the relationship between the command position and the present position of the control object in the conventional PID control apparatus shown in FIG. 10, as well as the relationship between the command speed and the actual speed of the control object.

The relationship between the command speed of motor 31 and the actual speed od motor 31 is shown at the bottom of FIG. 7. Curve "A" represents the speed command signal (i.e. command speed V) generated from speed command signal generating section 21. Curve "a" represents the actual speed of motor 31 driven in accordance with the given command speed V. Curves "B" and "b" shown in FIG. 7 are identical with curves "B" and "b" shown in FIG. 13. Curve "C" represents the increment value of the speed command signal sent from speed command signal generating section 21, i.e. the command position of slider 34. Curve "c" represents the present position of slider 34 driven in accordance with the speed command signal. Curves "D" and "d" shown in FIG. 7 are identical with curves "D" and "d" shown in FIG. 13.

When the speed command signal is generated at step 121, the switching signal is sent to switching section 23. Through this switching operation by switching section 23, FF control section 22 is operated by the level of 100% and the position control section 25 is operated by the level of 0%. The speed command signal (i.e. acceleration signal) generated from speed command signal generating section 21 is sent to FF control section 22 and also to speed control section 28 through second adder 29b. When the speed command signal is entered into speed control section 26, the speed control section 26 gives this speed command signal (i.e. acceleration signal) to motor 31 as a speed control amount based on the predetermined speed control parameter (i.e. second control parameter). In response to this speed command signal, motor 31 accelerates its speed as shown by curve "a" of FIG. 7. Complete two revolutions of motor 31 makes slider 34 move by a distance of approximately 40 mm, when the ball screw has a lead of 20 mm.

Then, at step 122, identification section 28 of PID control section 20 makes a judgement as to whether the command speed V of the speed command signal generated from speed command signal generating section 21 has reached to a preset command speed Vn shown in FIG. 7. The preset command speed Vn needs to be a value more than 50% of Vmax, and preferably be approximately 70%.

When the command speed V has reached the preset command speed Vn (i.e. "YES" at the step 122), the control flow proceeds to step 123. On the other hand, when the command Speed V has not yet reached the preset command speed Vn (i.e. "NO" at the step 122), the control flow proceeds to step 124.

At step 123, identification section 28 of PID control apparatus 20 obtains the increment value of acceleration speed command signal corresponding to the preset command speed Vn, i.e. the command position P1 of slider 34. Then, identification section 28 calculates a positional deviation Pe based on the command position P1 of slider 34 and the present position P2 of slider 34 detected by encoder 40. I.e. Pe=P1-P2. Next, at step 124, identification section 28 makes a judgement as to whether the command speed V (refer to curve A of FIG. 7) of the speed command signal generated from speed command signal generating section 21 has reached the maximum command speed Vmax.

When the command speed V has reached the maximum command speed Vmax ("YES" at step 124), the control flow proceeds to the next step 125 to decelerate the speed (command speed=0) to stop motor 31. On the other hand, when the command speed V has not yet reached the maximum command speed Vmax ("NO" at step 124), the processing through steps 122 to 124 is repeated.

At step 125, identification section 28 causes the speed command signal generating section 21 to generate the speed command signal, so that the command speed is reduced from Vmax to 0. Next, at step 126, based on the present position data of slider 34 detected by encoder 40, a judgement is made as to whether the actual speed of slider 34 is reduced to 0.

When the judgement result is "NO" at step 126, the control flow returns to the above-described step 125 to repeat the processing of this step. On the other hand, when the judgement result is "YES" at step 126, the control flow proceeds to the next step 127.

At step 127, in accordance with the following equation (1), identification section 28 calculates the load inertia I based on the positional deviation Pe obtained at the above-described step 123.

$$I = K_a \cdot P_e + K_b \quad (1)$$

where Ka and Kb represent coefficients at the time the command speed becomes the preset command speed Vn.

Then, at step 128, the load-inertia identification processing is terminated. Slider 34 is returned to the original position by rotating motor 31 by an amount equivalent to complete two revolutions in the reverse direction.

As described above, the load inertia I of robot 30 is identified in accordance with the above-described equation (1) based on the positional deviation Pe (refer to an encircled portion in FIG. 7) which is derived from the command position P1 and the present position P2 of slider 34 at the time (i.e time tq shown in FIG. 7) the command speed V of the speed command signal just becomes the preset command speed Vn. Accordingly, as apparent from FIG. 7, the load inertia identification of the present invention can be early accomplished by the time tp which is shorter than a time tp required in the conventional identification, i.e. tq<tp.

FIG. 6 is the flow chart (i.e. sub routine) illustrating the details of the tuning operation (i.e. step 140 of the main routine shown in FIG. 3). After finishing the load inertia identification, identification section 28 changes the position control parameter (i.e. first control parameter) preset in the position control section 25 and the speed control parameter (i.e. second control parameter) preset in the speed control section 26, based on the identified load inertia obtained at step 127. The position control parameter (i.e. first control parameter) and the speed control parameter (i.e. second control parameter), thus changed, are used as initial values for the tuning operation. Thus, the changed position control parameter (i.e. initial value of the position control parameter) is given to the position control section 25, while the changed speed control parameter (i.e. initial value of the speed control parameter) is given to the speed control section 26.

Then, at step 140a, identification section 28 starts the processing for the tuning operation. Motor 31 is actuated in accordance with the initial values of the control parameters, and slider 34 moves in synchronism with the rotation of motor 31.

The identification section 28 of PID control apparatus 20 activates the speed command signal generating section 21 to generate the acceleration speed command signal having the speed pattern shown by curve A of FIG. 7, and increments this speed command signal. At the same time, identification section 28 sends the switching signal to switching section 23. Through this switching operation, FF control section 22 is operated by the level of 30% and the position control section 25 is operated by the level of 70%.

The speed command signal generated from speed command signal generating section 21 is converted into the command position by integrating it in the integral element 24. This command position signal and the present position signal obtained from encoder 40 are both entered into the first adder 29a. Then, the positional deviation signal is sent from first adder 29a to position control section 25. When the positional deviation signal is entered into the position control section 25, it becomes a 70% positional deviation signal because the position control section 25 is operated at the level of 70%. This 70% positional deviation signal is sent to the second adder 29b as the first speed signal based on the initial value of the position parameter (i.e. first control parameter).

On the other hand, the speed command signal, generated from the speed command signal generating section 21 and entered into FF control section 22, becomes a 30% speed command signal (i.e. second speed signal) because the FF control section 22 is operated by the level of 30%. This 30% speed command signal is sent to the second adder 29b. Second adder 29b receives the second speed signal generated from FF control section 22, the first speed signal generated from the position control section 25, and the actual speed signal which is the signal supplied from encoder 40 and differentiated by derivative element 27. Second adder 29b obtains the speed deviation signal based on these three input signals and sends the resultant speed deviation signal to speed control section 26. When the speed deviation signal is entered into the speed control section 26, the speed control section 26 gives this speed deviation signal to motor 31 as a speed control amount based on the initial value of the speed control parameter (i.e. second control parameter). Thus, motor 31 is driven by the speed based on the speed control amount.

Next, identification section 28, at step 141, obtains the present position signal (i.e. present position data) of slider 34 from encoder 40 acting as the monitor device. Then, at step 142, a difference is obtained between the movable range setting data (i.e. setting position data) of slider 34 being set at step 113 and the present position data obtained at step 141 of FIG. 6. Then, at step 143, identification section 28 calculates the actual acceleration of slider 43 based on the variation of the present position change of slider 34 obtained at step 141, then goes to step 144.

At step 144, the actual acceleration of slider 34 calculated at step 143 is compared with a predetermined abnormal threshold for slider 34. When the actual acceleration is smaller than the abnormal threshold (i.e. "YES" in step 144), control flow proceeds to step 146. On the other hand, when the actual acceleration is not smaller than the abnormal threshold (i.e. "NO" in step 144), control flow proceeds to step 145. In step 145, counting operation of abnormal data is started to increment the count value of abnormal data. Then, the control flow proceeds to step 146.

At step 146, identification 28 makes a judgement as to whether the actual speed of slider 34 calculated at step 143 is reduced to 0, i.e. whether the slider 34 is stopped. If slider 34 has not yet stopped and hence the acceleration is not 0 (i.e. "NO" in step 148), the control flow returns to step 141 to repeat the above-described processing of steps 141 through 146. When the actual acceleration becomes 0 during the continuous repetition of the processing of steps 141 through 146 (i.e. "YES" in step 146), the processing for the tuning operation is terminated at step 147. Motor 31 is rotated in the reverse direction to return slider 34 to the original position.

After finishing the tuning operation at step 147, the control flow returns to step 150 of the main routine (FIG. 3). At step 150, PID control apparatus 20 judges whether the operation is normal or acceptable.

When the present position of slider 34 obtained at step 141 of FIG. 6 has passed the adjusted operation amount being set at step 115 of FIG. 4 and there is a significant amount of difference at step 142 and further the judgement result is "YES" at step 146 of FIG. 6, the identification section 28 of PID control apparatus 20 judges that slider 34 has caused overshoot. Hence, the judgement result of step 150 becomes "NO". When the difference calculated at step 142 is larger than a predetermined value (referred to "in-position" as a allowable range for the positioning operation) and the judgement result is "YES" at step 146, the identification section 28 of PID control apparatus 20 judges that slider 34 is out of the in-position range. Hence, the judgement result of step 150 becomes "NO".

Furthermore, when the increment value of the abnormal data counter obtained at step 145 is larger than a predetermined value (e.g. 3 to 5), it is judged that the operation of motor (i.e. control object) is instable, i.e. the motor operation is abnormal. Hence, the judgement result of step 150 becomes "NO".

In this manner, when the judgement result is "NO" at step 150, the processing of step 160, 180 and 140 is continuously repeated. Then, if the judgement result turns to "YES" at step 150, the operation for tuning the control parameters is terminated at step 190.

Figures 8, 9:
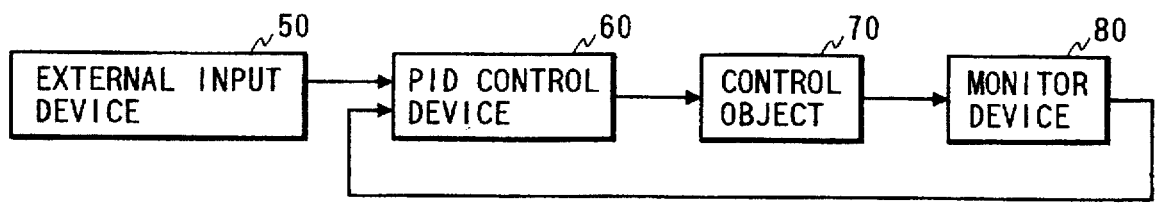
FIG. 8 is a view showing an error display example.
FIG. 9 is a schematic block diagram showing a control system using a conventional PID control apparatus.
Figure 10:
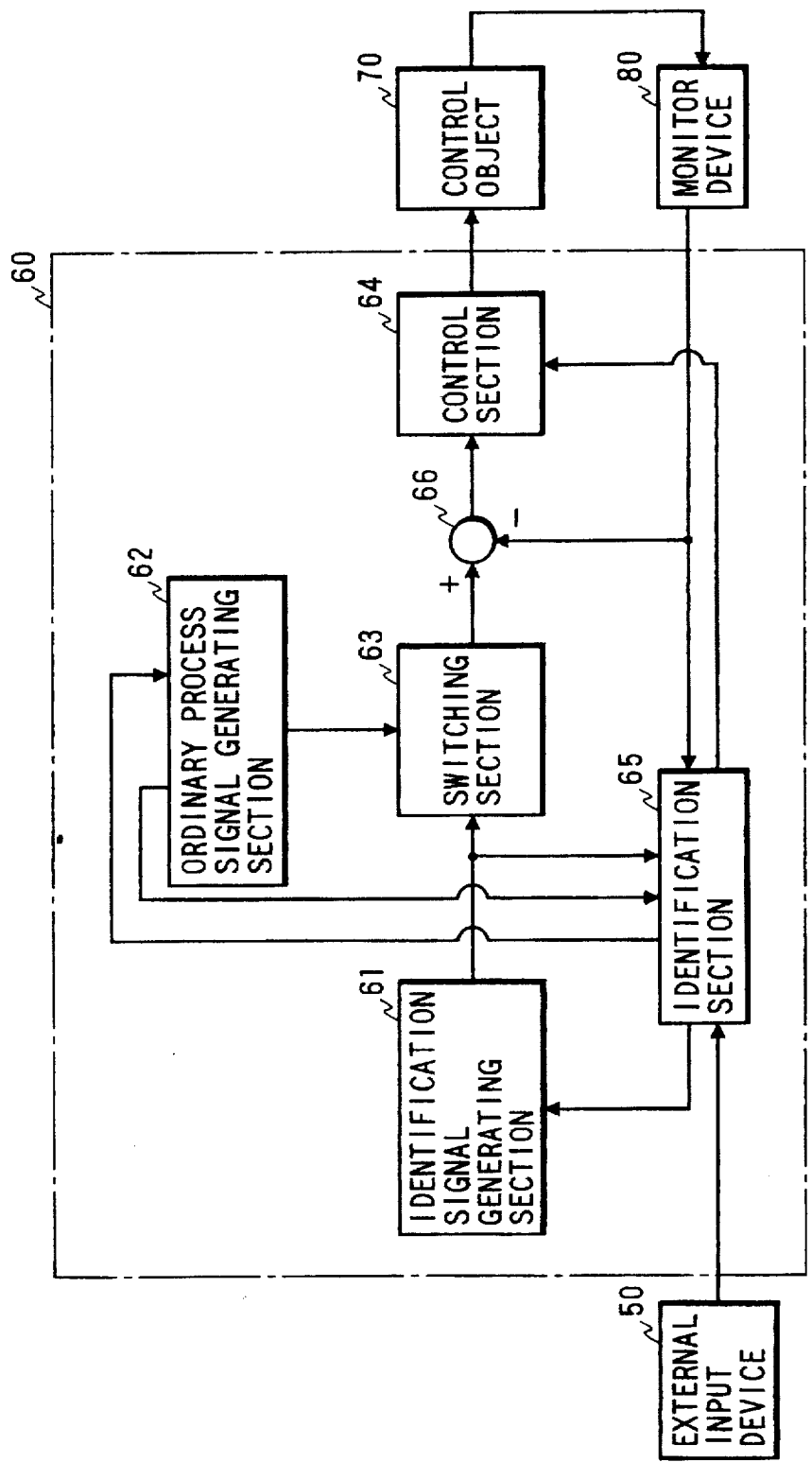
FIG. 10 is a detailed block diagram showing the arrangement of the conventional PID control apparatus shown in FIG. 9.
Figure 11:
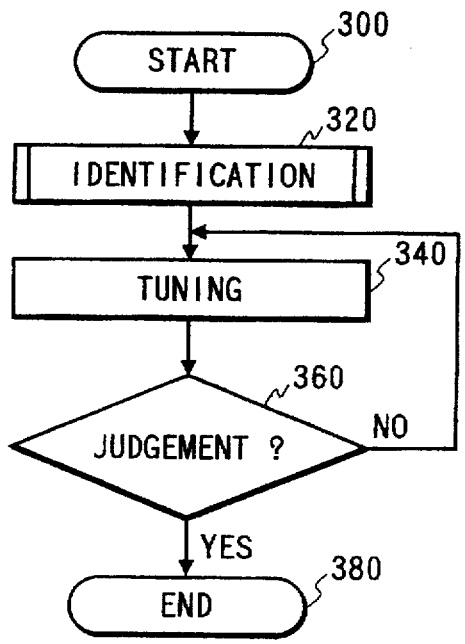
FIG. 11 is a flow chart showing an operation of the conventional PID control apparatus shown in FIG. 9.
Figure 12:
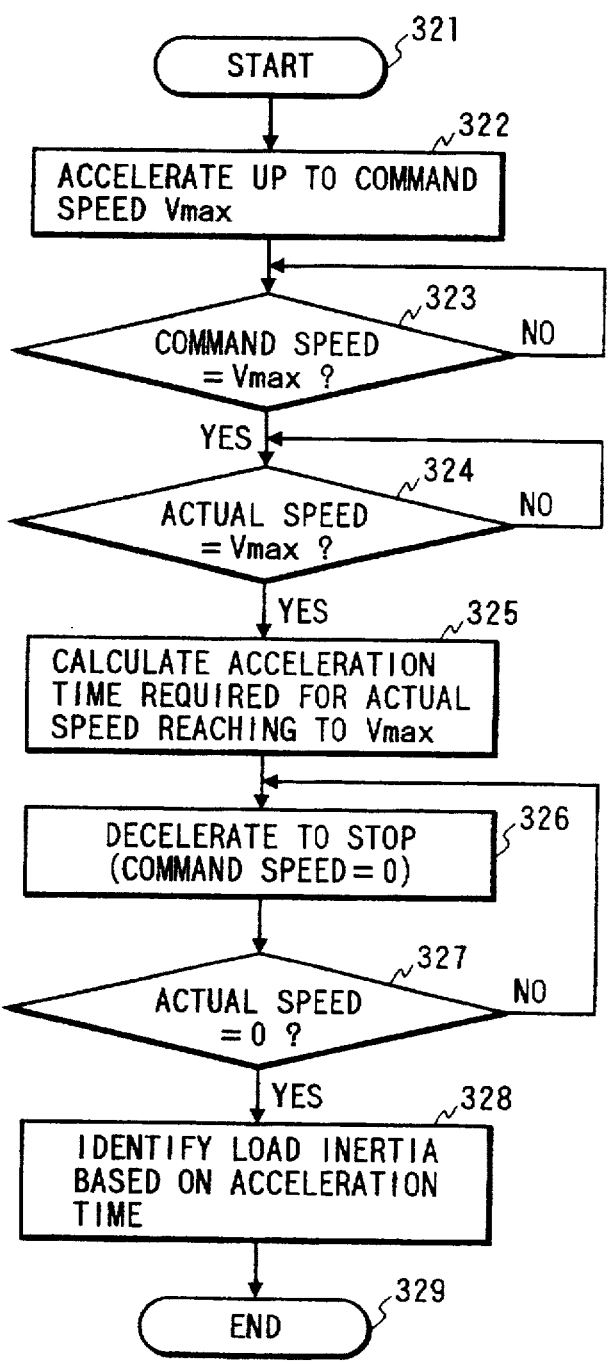
FIG. 12 is a flow chart, serving as a subroutine of the flow chart of FIG. 11, which shows an operation of identifying a load inertia in the conventional PID control apparatus shown in FIG. 9.

When the setting of the control parameters is failed even after performing n (e.g. 3 to 5) trials, the identification section 28 of PID control apparatus 20, at step 170, sends out a warning signal to external input device 10 to generate or display alarm. In response to this warning signal, external input device 10 displays error display message as shown in FIG. 8. If the display screen is not large enough to display all of the message shown in FIG. 8, it will be acceptable to indicate the designated error number only so that the operator can check the content of error with reference to the operation manual of robot 30.

In the error message shown in FIG. 8, the external input device 10 displays the message "LACK OF RIGIDITY AT LOAD SECTION" to instruct the operator of robot 30 to increase the rigidity at the load section, when the present position of slider 34 has passed the adjusted operation amount being set at step 115 and there is a significant amount of difference at step 142 of FIG. 6 and further the judgement result is "YES" at step 146 of FIG. 6, and hence the identification section 28 of PID control apparatus 20 judges at step 150 of FIG. 3 that slider 34 has caused overshoot.

Furthermore, the external input device 10 displays the message "EXCESSIVE SLIDING RESISTANCE AT MOVABLE SECTION" to instruct the operator of robot 30 to reduce the sliding resistance at the movable section, when the difference calculated at step 142 is larger than the predetermined value and the judgement result is "YES" at step 146, and hence the identification section 28 judges at step 150 that slider 34 is out of the in-position range. Hence, the judgement result of step 150 becomes "NO".

Yet further, the external input device 10 displays the message "LACK OF RIGIDITY AT TRANSMISSION MECHANISM, OR EXCESSIVE BACKLASH AT GEAR" to instruct the operator of robot 30 to increase the rigidity of the transmission mechanism (i.e. coupling 32) and eliminate the backlash, when the increment value of the abnormal data counter obtained at step 145 is larger than the predetermined value (e.g. 3 to 5), and hence it is judged at step 150 that the operation of motor (i.e. control object) is instable.

As explained above, according to the embodiment of the present invention, the load inertia I is identified based on the positional deviation Pn between the command position of slider 34 and the present position of slider 34 monitored by encoder 40 (refer to FIG. 7). Accordingly, it is no longer necessary to provide a special identification signal generating device. It will provide a simple and easy construction of the system, and reduce the overall cost and facilitates the production thereof.

Furthermore, the operation of identification processing can be simplified because the load inertia I is identified based on the speed pattern generated from speed command signal generating section 21. In other words, the identification can be realized quickly and automatically without taking account of the adequacy of the control parameters of this kind of PID control apparatus, i.e. without relying on the expert knowledge or experience.

Yet further, actuating motor 31 based on the speed command generated from the speed command signal generating section 21 makes it possible to prevent slider 34 from being abruptly moved. Hence, the slider 34 and its arm will not be damaged.

Still further, there is no necessity of continuously accelerating motor 31 until the actual speed of motor 31 reaches to the maximum value Vmax. It means that the time required for the identification of the load inertia can be reduced from tp to tq (refer to FIG. 7). Accordingly, the working efficiency in the load-inertia identification can be improved. Moreover, the load inertia can be identified even if the moving distance of slider 34 is short. Hence, there is no longer necessary to remove the obstacles existing within the moving space of slider 34. Thus, the working efficiency in the load-inertia identification can be further improved.

Besides the above-described embodiment, the present invention can be variously embodied. For example, the PID control apparatus used for the transportation robot in the above-described embodiment can be applied to other servo control system.

As this invention may be embodied in several forms without departing from the spirit of essential characteristics thereof, the present embodiment described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A motor control apparatus associated with a motor moving a control object having load inertia in accordance with its rotation and automatically adjusting preset control parameters based on the positional deviation between the command position of the control object and the present position of the control object, comprising:

monitor means for observing the present position of said control object;

speed command signal generating means for generating a speed command signal for accelerating or decelerating said control object in accordance with a predetermined pattern;

speed control means for giving said speed command signal generated from said speed command signal generating means to said motor as a control amount in accordance with said preset control parameters; and identification means for identifying the load inertia of said control object based on a positional deviation signal between a command position signal of said control object obtainable from said speed command signal and a present position signal obtainable from said monitor means at the time said speed command signal generated from said speed command signal generating means becomes a predetermined speed, so that the load-inertia identification of said control object can be performed prior to the automatic adjustment of said preset control parameters.

2. The motor control apparatus in accordance with claim 1, wherein, assuming that I represents said load inertia and Pe represents said positional deviation, said load inertia I is obtained according to the following equation $$I = Ka \cdot Pe + Kb$$

where Ka and Kb represent coefficients at the time said speed command signal becomes the predetermined speed.

3. A motor control apparatus associated with a motor moving a control object having load inertia in accordance with its rotation and automatically adjusting preset control parameters based on the positional deviation between the command position of the control object and the present position of the control object, comprising:

monitor means for observing the present position of said control object;

speed command signal generating means for generating a speed command signal for accelerating or decelerating said control object in accordance with a predetermined pattern;

position control means for obtaining a positional deviation signal based on the command position which is obtained by integrating said speed command signal generated from said speed command signal generating means and the present position of said control object supplied from said monitor means, said positional deviation signal being a speed signal in accordance with a first control parameter of said control parameters, and outputting a first speed signal having the level of a predetermined first ratio of said speed signal;

feedforward control means for outputting a second speed signal having the level of a predetermined second ratio of said speed command signal generated from said speed command signal generating means;

speed control means for obtaining a speed deviation signal based on said first speed signal produced from said position control means, said second speed signal produced from said feedforward control means, and an actual speed signal obtained by differentiating said present position supplied from said monitor means, and giving said speed deviation signal to said motor as a control amount in accordance with a second control parameter of said control parameters;

switching means for giving said predetermined first ratio to said position control means and giving said predetermined second ratio to said feedforward control means; and identification means for identifying the load inertia of said control object, wherein, when said load inertia is identified, said switching means sets said predetermined second ratio to be larger than said predetermined first ratio, and said identification means identifies the load inertia of said control object based on a positional deviation signal between a command position signal of said control object obtainable from said speed command signal and a present position signal obtainable from said monitor means at the time said speed command signal generated from said speed command signal generating means becomes a predetermined speed, when said first and second control parameters are adjusted, said switching means sets said predetermined second ratio to be smaller than said predetermined first ratio, and said identification means sets said first and second control parameters in accordance with the identified load inertia as initial values of the control parameters in the adjustment of the control parameters.

4. The motor control apparatus in accordance with claim 3, wherein, when said load inertia is identified, said predetermined first ratio is set to 0% and said predetermined second ratio is set to 100%, and when said first and second control parameters are adjusted, said predetermined first ratio is set to 70% and said predetermined second ratio is set to 30%.

5. The motor control apparatus in accordance with claim 3, wherein, assuming that I represents said load inertia and Pe represents said positional deviation, said load inertia I is obtained according to the following equation $$I = Ka \cdot Pe + Kb$$

where Ka and Kb represent coefficients at the time said speed command signal becomes the predetermined speed.

* * * * *